Dec. 8, 1970  G. W. CHURCH, JR  3,545,155
CONFINED SOIL BRICKS
Filed Sept. 17, 1965

GEORGE W. CHURCH, JR.
INVENTOR

BY John C. Stahl

ATTORNEY

United States Patent Office 3,545,155
Patented Dec. 8, 1970

3,545,155
CONFINED SOIL BRICKS
George W. Church, Jr., 113 Moss Drive,
San Antonio, Tex. 78213
Filed Sept. 17, 1965, Ser. No. 488,129
Int. Cl. *E04c 1/04*
U.S. Cl. 52—596      1 Claim

ABSTRACT OF THE DISCLOSURE

A confined soil brick including a preformed container of desired configuration with a compacted soil filler therein; a water repellant coating or sheet material may be applied to at least one side of said container.

---

The present invention relates to confined soil bricks and more particularly to such confined soil bricks which utilize the soil available at the building site.

Generally speaking, there are two processes which utilize soil for constructional purposes. One such process is to stabilize the soil while the second is to confine the soil. Stabilized soil construction includes adobe, wattle and daub, pise' cob, and compressed blocks. Confined soil has heretofore been used only in foundations such as when a layer of sand or rock is put down for the foundation of the building.

The present invention relates to confined soil bricks wherein the soil in the locality is utilized; such soil is placed in a preformed container and compacted therein.

An object of the present invention is the provision of a low cost building material which may be manufactured at the construction site.

Another object is to provide such a building material utilizing readily available materials which often are unused and must be transported away from the construction site.

A further object of the invention is the provision of a low cost building material which last indefinitely and is easy to maintain.

Still another object is to provide such a building material which is inexpensive to manufacture, capable of mass production techniques, easy to use, and wide spread in its applicability.

Other objects and features of the invention will become apparent to those skilled in the art as the disclosure is made in the following detailed description of preferred embodiments of the invention as illustrated in the accompanying sheet of drawings in which.

Figure 1:
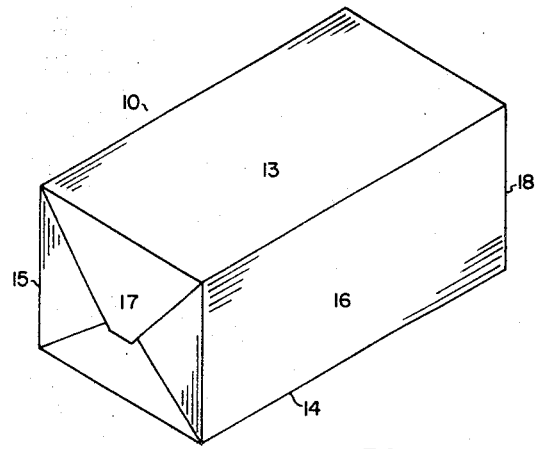
FIG. 1 is an isometric view of a confined soil brick of the subject invention.
Figure 2:
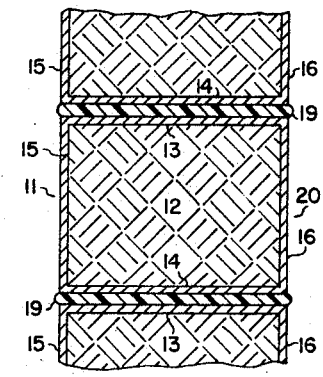
FIG. 2 is a vertical sectional view through a wall constructed with the confined soil brick of FIG. 1.

Referring now to the drawings wherein like reference characters designate like or corresponding parts throughout the several views, there is shown in FIG. 1 a compacted soil brick 10 comprising a container 11 (see FIG. 2) and a filler therein, said container consisting of top 13, bottom 14, sides 15–16, and ends 17–18. In the embodiments of FIGS. 1 and 2 of the drawings, container 11 is foldable, preformed to provide a brick of desired dimensions, and composed of heavy duty Kraft paper, cardboard, or the like.

To construct a brick in accordance with the principles of the subject invention, a container 11 is expanded and placed in a vertical mold (not shown) of desired configuration with the open end upward, and the filler 12, hereinafter to be more fully described, deposited therein. Filler 12 is then compacted as by ramming or the like to provide a desired density; such compaction not only increases the stability of the filler by increasing the mechanical bonds of the particles, but also increases cohesion by decreasing the thickness of water films and expels air from the pores in the said filler. The uppermost end 18 of the container may be folded in a conventional manner and the flap secured as by means of a suitable adhesive or the like. It is to be understood that although a mold is not required for forming such bricks, the use of a mold is preferred in that each of the bricks thus formed are of uniform height, width, and length.

There is shown in FIG. 2 of the drawings a plurality of bricks 10 which are used to form a wall or other structure. An adhesive 19 is placed between courses of such bricks as well as between the ends of adjacent bricks. In such teaching, the term adhesive is used generically and includes cement, glue, mucilage, and paste. Polyvinyl acetate polymers give good initial tack and rapid set; polyvinyl alcohol, produced by the partial or complete hydrolysis of the acetate, is an excellent adhesive—it is a water soluble powder and may be extended with starch, dextrins, and other products; asphalt forms an effective moisture barrier and may be utilized where color is of minor importance. Commercially available dry mix adhesives include "Gelva" Powder 700, "Gelva" Powder 702, and "Gelvatol" 1–90, 3–90, and 40–10, manufactured by Shawinigan Resins Corporation. "Gelva" S–55, TS–30, TS–70, TS–71, TS–100, and D–845, by the same manufacture, provide high bond strength.

The outer surface of the structure thus formed, indicated generally by 20, may be treated with asphalt, paint, synthetic rubbers, or the like, to aid in preventing damage to such bricks as a result of weathering or physical damage.

Figure 3:
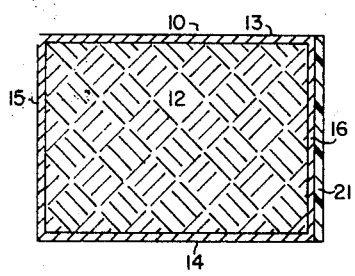
FIG. 3 is a vertical sectional view through another embodiment of the invention.

Referring now to FIG. 3 of the drawings, there is shown a brick 10 constructed substantially in accordance with the principles heretofore described in connection with FIGS. 1 and 2 of the drawings, wherein a coating 21 is applied to side 16 of said container during manufacture. The coating 21 may consist of wax, water repellant, or the like, and may be applied to one side of the container which is to be used as the outer surface of the structure, or additionally, may be applied to the opposite side, corresponding to the inner surface of the structure.

Figure 4:
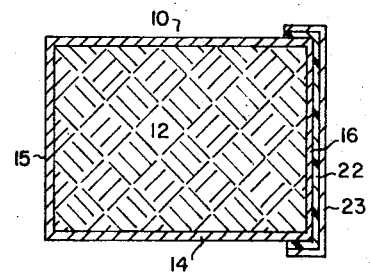
FIG. 4 is a vertical sectional view through still another embodiment of the invention.

There is illustrated in FIG. 4 of the drawings another embodiment of the invention; in such embodiment an adhesive 22 is applied to side 16 of the container and a layer 23 of aluminum foil, sheet plastic, or the like, bonded thereto. The top, bottom, and ends of layer 23 are turned perpendicularly inward and are bonded to the corresponding portions of the container. Synthetic rubbers such as butyl, polyisobutylene, neoprene, butadiene-acrylonitrile, butadiene-styrene, and chlorinated rubber effectively bond the metal foils to such container.

Figure 5:
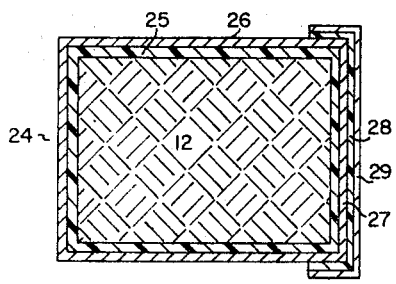
FIG. 5 is a vertical sectional view through a further embodiment of the invention.

In FIG. 5 of the drawings there is shown a brick 24 consisting, in part of an inner container 25 and an outer container 26, preferably of asphalt paper or the like. Container 25 is preferably of polyethylene or similar plastic and aids in the prevention of drying of the filler 12 sealed therein. One side 27 of such container includes an adhesive 28 with a layer 29 of metal foil bonded thereto; such layer 29 is partially wrapped around and secured to the top, bottom, and ends of container 26.

It is understood that when the embodiments of FIGS. 3–6 are utilized for constructional purposes, the adhesive 19 heretofore mentioned is utilized between courses of such bricks as well as between adjacent bricks.

The filler 12, heretofore mentioned, in each of the embodiments of the invention consists of soil which falls within the groups designated by the symbols A-1 to A-8, respectively, as established by the Bureau of Public Roads, United States Department of Commerce. Table 1, below, lists the soil constituents for each such group.

TABLE 1

| Group: | Soil constitutents |
|---|---|
| A-1 | Well-graded materials; sand, silt, and clay; excellent binder. |
| A-2 | Coarse and fine materials; improper grading or inferior binder. |
| A-3 | Sand, no binder. |
| A-4 | Cohesionless silts; friable clays; no appreciable amount of sticky colloidal clay. |
| A-5 | Micaceous and diatomaceous silts and sands. |
| A-6 | Cohesive clays; dispersed state. |
| A-7 | Micaceous, diatomaceous, and flocculated clays; may contain lime or associated chemicals productive of flocculation in soils. |
| A-8 | Peats and mucks. |

Prior to placement of the selected soil in the containers of the subject invention, the soil is first passed through a screen having a one-half inch mesh.

A variety of stabilizing materials can be added to such filler, if required, to improve the soil properties before it is made into bricks; such stabilizers include but are not specifically limited to lime, calcium, chloride, gypsum and portland cement.

It should be understood, of course, that the foregoing disclosure relates to only preferred embodiments of the invention and that numerous modifications or alterations may be made therein without departing from the spirit and scope of the invention as set forth in the appended claim.

What is claimed is:
1. A confined soil brick comprising:
first and second containers,
said first container composed of plastic and said second container composed of asphalt paper,
said first container inserted into said second container,
said second container including a top, bottom, first and second sides, and first and second ends,
a filler deposited and compacted in said first container,
an adhesive applied to at least one side of said second container, and
a sheet of metal foil bonded to said adhesive.

References Cited

UNITED STATES PATENTS

| 1,252,415 | 1/1918 | Duckham | 52—232 |
| 1,475,570 | 11/1923 | Dye | 52—173 |
| 2,150,809 | 3/1939 | Rugg et al. | 52—599 |
| 2,361,205 | 10/1944 | Hoover | 52—596 |
| 3,025,641 | 3/1962 | Ahtiainen | 52—415 |
| 3,185,255 | 5/1965 | Bird | 52—596 |
| 3,230,681 | 1/1966 | Allen et al. | 52—309 |
| 3,231,451 | 1/1966 | Gazelle | 52—309 |
| 3,283,518 | 11/1966 | Toffolon | 52—169 |

FOREIGN PATENTS

| 24,081 | 8/1935 | Australia. |
| 481,596 | 3/1938 | Great Britain. |
| 1,086,396 | 8/1954 | France. |

HENRY C. SUTHERLAND, Primary Examiner

U.S. Cl. X.R.

52—169, 515, 599